US009355146B2

(12) United States Patent
Arndt et al.

(10) Patent No.: US 9,355,146 B2
(45) Date of Patent: May 31, 2016

(54) EFFICIENT PARTITIONED JOINS IN A DATABASE WITH COLUMN-MAJOR LAYOUT

(75) Inventors: Stefan Arndt, Leipzig (DE); Gopi K. Attaluri, San Jose, CA (US); Ronald J. Barber, San Jose, CA (US); Guy M. Lohman, San Jose, CA (US); Lin Qiao, San Jose, CA (US); Vijayshankar Raman, Sunnyvale, CA (US); Eugene J. Shekita, San Jose, CA (US); Richard S. Sidle, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 13/537,745

(22) Filed: Jun. 29, 2012

(65) Prior Publication Data

US 2014/0006379 A1   Jan. 2, 2014

(51) Int. Cl.
*G06F 17/30*   (2006.01)

(52) U.S. Cl.
CPC ................. *G06F 17/30466* (2013.01)

(58) Field of Classification Search
CPC ............. G06F 17/30864; G06F 17/30867; G06F 17/30466
USPC ......... 707/705, 706, 713, 714, 721, 736, 758, 707/781, 999.001–999.006
See application file for complete search history.

(56) References Cited

U.S. PATENT DOCUMENTS

| | | | |
|---|---|---|---|
| 5,873,074 A | 2/1999 | Kashyap | |
| 6,154,826 A * | 11/2000 | Wulf et al. | 711/217 |
| 6,411,951 B1 | 6/2002 | Galindo-Legaria | |
| 6,453,313 B1 | 9/2002 | Klein | |
| 6,477,525 B1 | 11/2002 | Bello | |
| 7,035,851 B1 | 4/2006 | Sinclair | |
| 7,457,935 B2 * | 11/2008 | Uppala | 711/173 |
| 7,461,060 B2 | 12/2008 | Beavin | |
| 7,464,247 B2 * | 12/2008 | Uppala | 711/173 |
| 7,469,241 B2 | 12/2008 | Bellamkonda | |
| 7,624,120 B2 | 11/2009 | Pawar | |
| 2004/0122845 A1 * | 6/2004 | Lohman et al. | 707/102 |
| 2005/0038784 A1 * | 2/2005 | Zait et al. | 707/5 |
| 2010/0205351 A1 * | 8/2010 | Wiener et al. | 711/103 |
| 2011/0219020 A1 * | 9/2011 | Oks et al. | 707/769 |
| 2011/0302226 A1 * | 12/2011 | Abadi et al. | 707/825 |
| 2011/0320758 A1 * | 12/2011 | Craddock et al. | 711/206 |
| 2012/0011108 A1 * | 1/2012 | Bensberg et al. | 707/714 |
| 2012/0117065 A1 * | 5/2012 | Nehme et al. | 707/737 |

OTHER PUBLICATIONS

Fushimi, S. et al., "An Overview of the System Software of a Parallel Relational Database Machine GRACE," Proceedings of the 12th International Conference on Very Large Data Bases (VLDB '86), 1986, pp. 209-219, Morgan Kaufmann Publishers, United States.

(Continued)

*Primary Examiner* — Syling Yen
(74) *Attorney, Agent, or Firm* — Sherman IP LLP; Kenneth L. Sherman; Steven Laut

(57) ABSTRACT

Embodiments of the present invention provide a database processing system for efficient partitioning of a database table with column-major layout for executing one or more join operations. One embodiment comprises a method for partitioning a database table with column-major layout, partitioning only the join-columns by limiting the partitions by size and number, executing one or more join operations for joining the partitioned columns, and optionally de-partitioning the join result to the original order by sequentially writing and randomly reading table values using P cursors.

7 Claims, 9 Drawing Sheets

(56) References Cited

OTHER PUBLICATIONS

Bratbergsengen, K., "Hashing Methods and Relational Algebra Operations," Proceedings of the 10th International Conference on Very Large Data Bases (VLDB '84), 1984, pp. 323-333, Morgan Kaufmann Publishers, United States.

Dewitt, D.J. et al., "Implementation Techniques for Main Memory Database Systems," Proceedings of the 1984 ACM SIGMOD International Conference on Management of Data (SIGMOD '84), 1984, pp. 1-8, ACM, United States.

Abadi, D. et al., "Materialization Strategies in a Column-Oriented DBMS," Proceedings of the 2007 IEEE 23rd International Conference on Data Engineering (ICDE '07), 2007, pp. 466-475, IEEE, United States.

U.S. Non-Final Office Action for U.S. Appl. No. 13/594,200 mailed Aug. 27, 2013.

Eich, M.H., "Mars: The Design of a Main Memory Database Machine", Database Machines and Knolwedge Base Machines, 1988, pp. 325-338, vol. 43, SpringerLink, United States.

U.S. Non-Final Office Action for U.S. Appl. No. 13/594,200 mailed Feb. 16, 2016.

* cited by examiner

EFFICIENT PARTITIONED JOINS IN A DATABASE WITH COLUMN-MAJOR LAYOUT

FIELD OF THE INVENTION

The present invention generally relates to database processing, and in particular to efficient partitioned joins in a database with column-major layout.

BACKGROUND

In database systems, hash joins are a commonly used operation in data warehouse query processing. An important challenge for hash joins is managing the sizes of the hash table used. Many systems employ partitioning to split hash tables into manageable sized chunks. One side of the hash join is chosen as inner and its hash table is partitioned. The inner table is also referred to in the literature as the "build" side. The rows of the other side (the outer table) of the join are also partitioned and then used to look up into the partitioned hash tables. The outer table is also referred to in the literature as the "probe" side. Traditionally, databases were disk-resident wherein the goal was to partition hash tables into memory-sized chunks. However, as main memories have grown much larger, the goal is to partition hash tables into cache-sized chunks.

BRIEF SUMMARY

Embodiments of the present invention provide a database processing system for efficient partitioning of a database table with column-major layout for executing one or more join operations. One embodiment comprises a method for partitioning a database table with column major layout, partitioning the columns containing join-columns, executing one or more join operations for joining the partitioned columns, and de-partitioning the results to achieve the original ordering by sequentially writing and randomly reading table values using multiple cursors.

In one embodiment the method further comprises partitioning the one or more columns containing join-columns by one or more steps, where in each step the number and size of partitions is limited and performing recursive partitioning if needed. Optionally, the partitions are de-partitioned to obtain the original column order by sequentially writing and randomly reading table values using multiple cursors, wherein the number of cursors is less than the number of entries in the translation lookaside buffer (TLB).

In one embodiment, the method further comprises joining partitioned hashes in tables with column-major layout by partitioning only the one or more columns of join-column values.

In one embodiment, the method further comprises joining a probe table with build tables in a join graph, forming lookup data structures on the build tables, mapping their respective join-column values of the lookup data structures to the values of any auxiliary columns that are needed in a query, and scanning the probe table, wherein for each batch of values, the values are looked up into the lookup data structures on the build tables.

In one embodiment, the method further comprises looking up the corresponding partition from the build table, extracting any auxiliary join-columns that are needed in the query, and computing a Boolean value indicating whether a join-column found any match in the lookup data structure. In one embodiment, the lookup data structure is a hash table.

In one embodiment, the method further comprises after lookup of a build table, de-partitioning the partitions.

In one embodiment, the method further comprises limiting the number of partitions in each step of partitioning to number of entries in the level-1 translation lookaside buffer (TLB) size.

In one embodiment, the method further comprises, when more partitions are needed, performing recursive partitioning in multiple steps.

In one embodiment, the method further comprises de-partitioning the partitions to obtain the original column order by sequentially writing and randomly reading table values using P cursors, wherein the number of cursors is less than the number of entries in the TLB.

These and other aspects, features and advantages of the invention will be understood with reference to the drawing figure, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
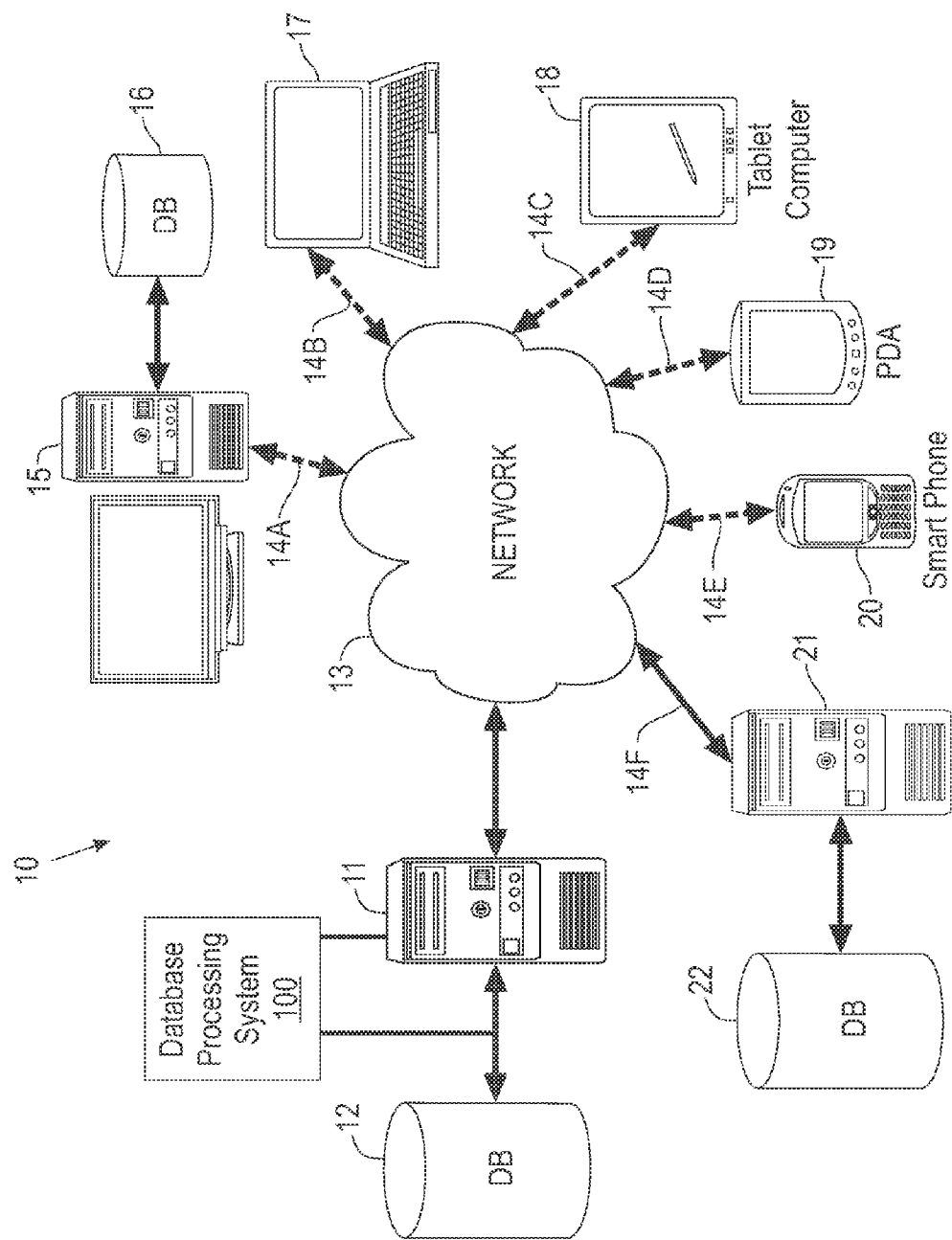
FIG. 1 is a block diagram illustrating an example of a computing system implementing database processing, according to an embodiment of the present invention.

The detailed description explains the preferred embodiments of the invention, together with advantages and features, by way of example with reference to the drawings.

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

One or more exemplary embodiments of the invention are described below in detail. The disclosed embodiments are intended to be illustrative only since numerous modifications and variations therein will be apparent to those of ordinary skill in the art.

In traditional DBMSs, joins are usually performed by partitioning input values into some number of partitions, for both sides of the join. The challenge in a column store (i.e., a DBMS where tables are laid out in column major order) is that input records are not available in materialized form (also known as late materialization). Application of the traditional partitioning requires separate partitioning of every column that is present in the intermediate state. Traditionally, the width of the probe table of the join grows as more and more tables are joined (because their auxiliary columns are all accumulated).

According to an embodiment of the invention, only the join-columns are partitioned. This improves the cache and memory utilization because other columns are not accessed during the join operation. In one embodiment, join-columns are those columns having one or more equality join predicates relating one or more columns of the probe table to one or more columns of the build table.

The present invention relates to partitioned hash joins in database tables having a column-major layout (also called column stores). In one embodiment the present invention provides a database processing system for efficient partitioning of a database table with column-major layout for executing one or more join operations. In one embodiment, partitioning comprises one or more steps of dividing each of the one or more columns containing join-columns (e.g., keys, primary keys, foreign keys) into multiple partitions. In each step, the number and size of the partitions may be limited.

In one embodiment the present invention provides a process for joining the keys in each partition with other tables to form join results, and then de-partitioning the partitioned join results to convert them into the original ordering by sequentially writing and randomly reading table values using multiple cursors.

In queries over such column stores, the intermediate state flowing through a query plan does not include rows. Instead, what flows through a query plan are column vectors: vectors of column values for a batch of rows. Each query plan operator operates on these vectors of column values and adds additional vectors according to the operation it performs. For example, an addition ("plus") operator adds two vectors, corresponding to its left-hand-side (LHS) and right-hand-side (RHS) inputs, and creates a new vector of the addition results.

According to an embodiment of the invention, such partitioning involves only the values of the join-columns. Because other columns are left un-partitioned, the partitioning of the join-columns is undone after the join-column values of the probe table have been looked up in the partitions of the build table. Overall, the amount of data that has to be moved in this scheme is twice the size of the join-columns. This is typically much smaller than moving the entire row. As such, embodiments of the invention reduce data movement. This is especially significant when one probe table is joined with multiple build tables. Embodiments of the invention provide mechanisms for the partitioning and de-partitioning processes, which are generally scatter/gather operations that deliver multiple discrete units of data from a file to separate, noncontiguous buffers in memory in one operation (and writes the data from noncontiguous buffers in one operation).

Referring now to the drawings, FIG. 1 illustrates an example of the basic components of a system 10 utilizing a database processing system 100 implementing partitioned joins in a database with column-major layout for query processing, according to an embodiment of the present invention. The system 10 includes a server 11 and the remote devices 15 and 17-20.

Each of the remote devices 15 and 17-20 has applications and can have a local database 16. Server 11 contains applications, and a database 12 that can be accessed by remote device 15 and 17-20 via connections 14(A-F), respectively, over network 13. The server 11 executes applications and may control access to itself and the database 12. The remote devices 15 and 17-20 may access the database 12 over a network 13. The server 11 may also be connected to the local area network (LAN) within an organization.

The remote devices 15 and 17-20 may each be located at remote sites. Remote devices 15 and 17-20 include but are not limited to, PCs, workstations, laptops, handheld computers, pocket PCs, PDAs, pagers, WAP devices, non-WAP devices, cell phones and handheld devices. Included with each remote device 15 and 17-20 is an ability to request information. Thus, when a user at one of the remote devices 15 and 17-20 desires to access information from the database 12 at the server 11, the remote devices 15 and 17-20 communicate over the network 13, to access the server 11 and database 12. Third party computer systems 21 and databases 22 can also be accessed.

Data that is obtained from third party computer systems 21 and database 22 can be stored on server 11 and database 12 in order to provide later access to the user on remote devices 15 and 17-20. It is also contemplated that for certain types of data that the remote devices 15 and 17-20 can access the third party computer systems 21 and database 22 directly using the network 13.

Figure 2:
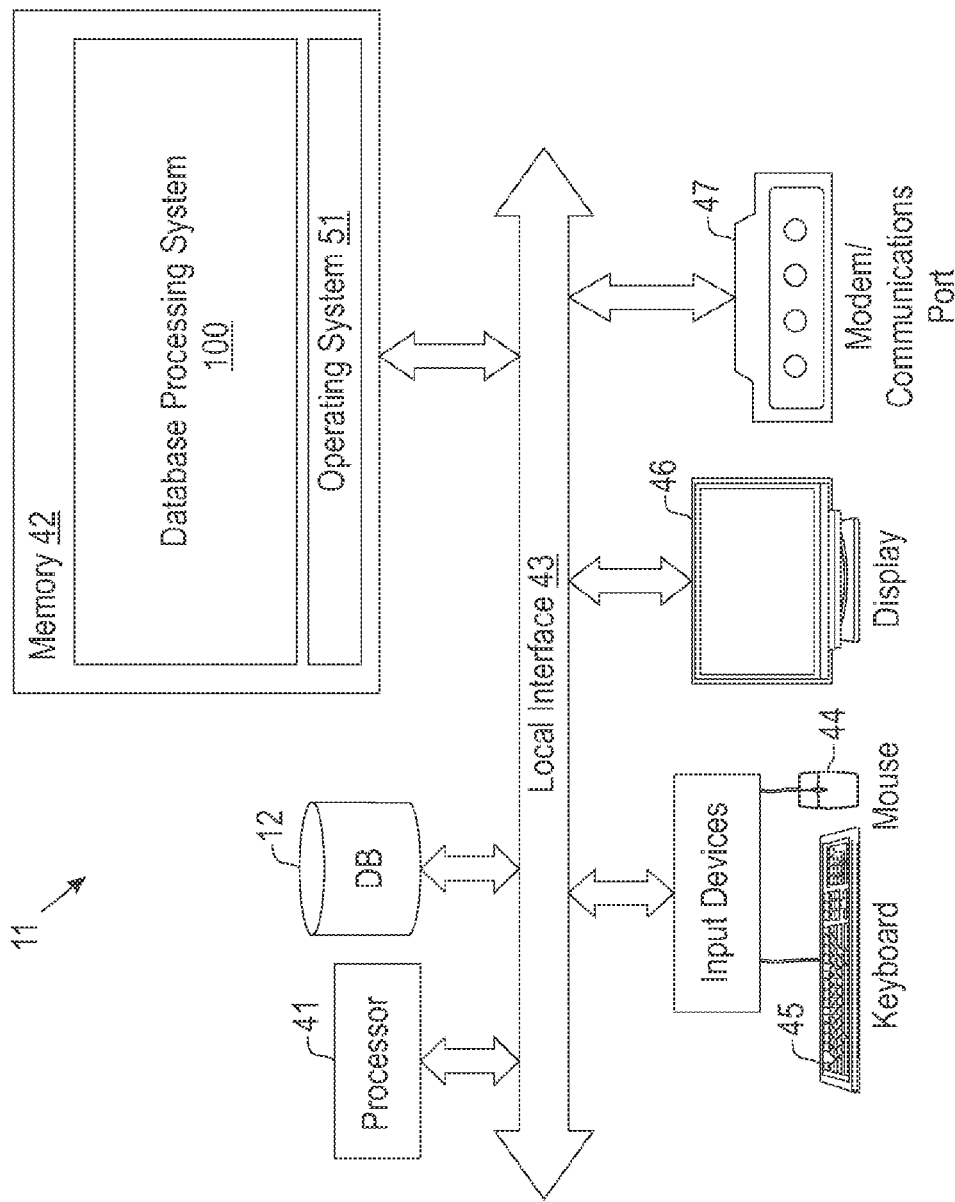
FIG. 2 is a block diagram illustrating an example of a server utilizing database processing, according to an embodiment of the present invention, as shown in FIG. 1.

Illustrated in FIG. 2 is a block diagram demonstrating an example of server 11, as shown in FIG. 1, utilizing the database processing system 100 according to an embodiment of the present invention. Server 11 includes, but is not limited to, database servers, PCs, workstations, laptops, PDAs, palm devices, computer systems, storage servers, and the like. The processing components of the third party computer systems are similar to that of the description for the server 11 (FIG. 2).

Generally, in terms of hardware architecture, as shown in FIG. 2, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communication. Further, the local interface 43 may include address, control, and/or data connections to enable appropriate communication among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.), solid state devices, etc. Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2, the software in the memory 42 includes a suitable operating system (O/S) 51 and the database processing system 100 of the present invention. The query database processing system 100 comprises functional components and process blocks described further below.

The operating system 51 essentially controls the execution of other computer programs, such as the database processing system 100, and provides scheduling, input/output control, file and data management, memory management, and communication control and related services. However, the database processing system 100 of the present invention is applicable on all commercially available operating systems.

The database processing system 100 may comprise a source program, executable program (object code), script, or any other entity comprising a set of computer program instructions to be performed. When the database processing system 100 is a source program, then the program is usually translated via a compiler, assembler, interpreter, or the like, which may or may not be included within the memory 42, so as to operate properly in connection with the O/S 51. The computer program instructions may execute entirely on server 11, partly on the server 11, as a stand-alone software package, partly on server 11 and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

When the database processing system 100 is implemented in software, as is shown in FIG. 2, it should be noted that the database processing system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the database processing system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the database processing system 100 of the present invention on server 11 and database 12 using for example, but not limited to an Internet browser. The information accessed in server 11 and database 12 can be provided in a number of different forms including but not limited to ASCII data, WEB page data (i.e., HTML), XML or other type of formatted data.

As illustrated, the remote devices 15 and 17-20 are similar to the description of the components for server 11 described with regard to FIG. 2. Herein, the remote devices 15 and 17-20 are referred to as remote devices 15 for the sake of brevity.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

An implementation of the system 100 for database processing according to an embodiment of the invention is described below in relation to FIGS. 3-9. The system 100 provides efficient partitioning of a database table with column-major layout for executing one or more join operations. Partitioning includes one or more steps of partitioning only the one or more join-columns (usually, but not limited to, primary keys or foreign keys) for a join operator, limiting the number and size of the partitions in each step to fit hardware cache and/or TLB constraints, and performing recursive partitioning if needed to achieve constraints on both the size and number of partitions. In one embodiment, the size of each partition is limited to the L2 cache size and the number of partitions is limited to the number of entries in the TLB, to necessitate recursive partitioning. After performing the join, the join results in the partitions are de-partitioned to obtain the original ordering.

In one embodiment, partitioning a database table with column major layout comprises partitioning the one or more columns on which the query specifies join predicates in one or more steps, wherein each step the number and size of the partitions is limited to fit hardware constraints. The partitioned columns are joined with values from a build table. The join results are then de-partitioned to convert them back into the original order, by reading the partitioned results using multiple cursors and sequentially writing the results.

Figure 3:
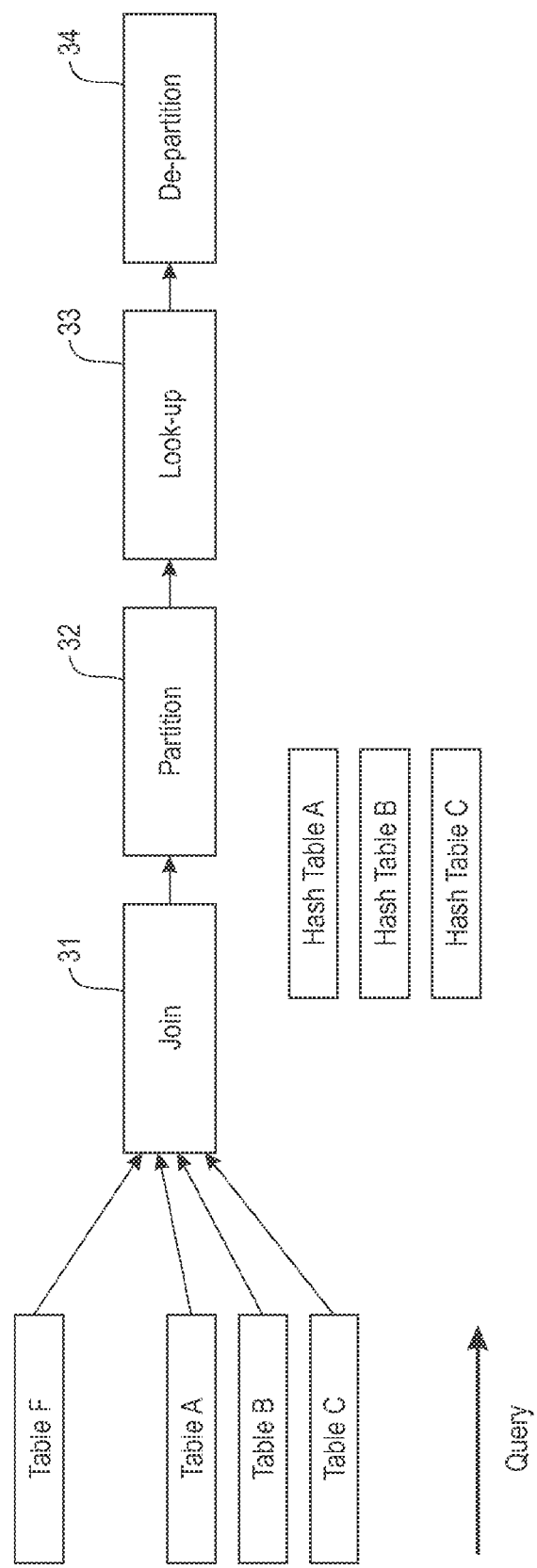
FIG. 3 illustrates an example hash join process in database processing, according to an embodiment of the present invention.

Referring to FIG. 3, in one embodiment, a hash join process 30 comprises a pipelined, n-way join. A Table F is joined with tables such as Table A, Table B, Table C by a join module 31, wherein Table F is the probe table and Tables A, B, C are the build tables (there can be any number of build tables: 1, 2, 3, or more). Embodiments of the invention are applicable to various schema, and certain implementations are described herein in relation to star schema such as in a star-like join graph.

According to the join process, look up tables are formed on Tables A, B, and C, mapping their respective join-column values to the values of any additional columns that are needed in the query. Example lookup data structures include tree-based structures, hash-based data structures, etc. In the example embodiments described herein a look up table comprises a hash table. The join-columns of Table F are scanned, and for each batch of values of those join-columns, the lookup module 33 looks up the values into the hash tables on Tables A, B, and C. In one embodiment the present invention provides a partition module 32 for a partitioned method for the look-up of the values of Table F into one or more of the hash tables. The lookup is performed in three stages, as described below. A de-partition module 34 de-partitions the partitioned join results to convert them into the original ordering. Note that in the FIG. 3, the 'partition→look-up→de-partition' can be repeated more times if the partitioned method is used for joining with more tables.

Figure 4:
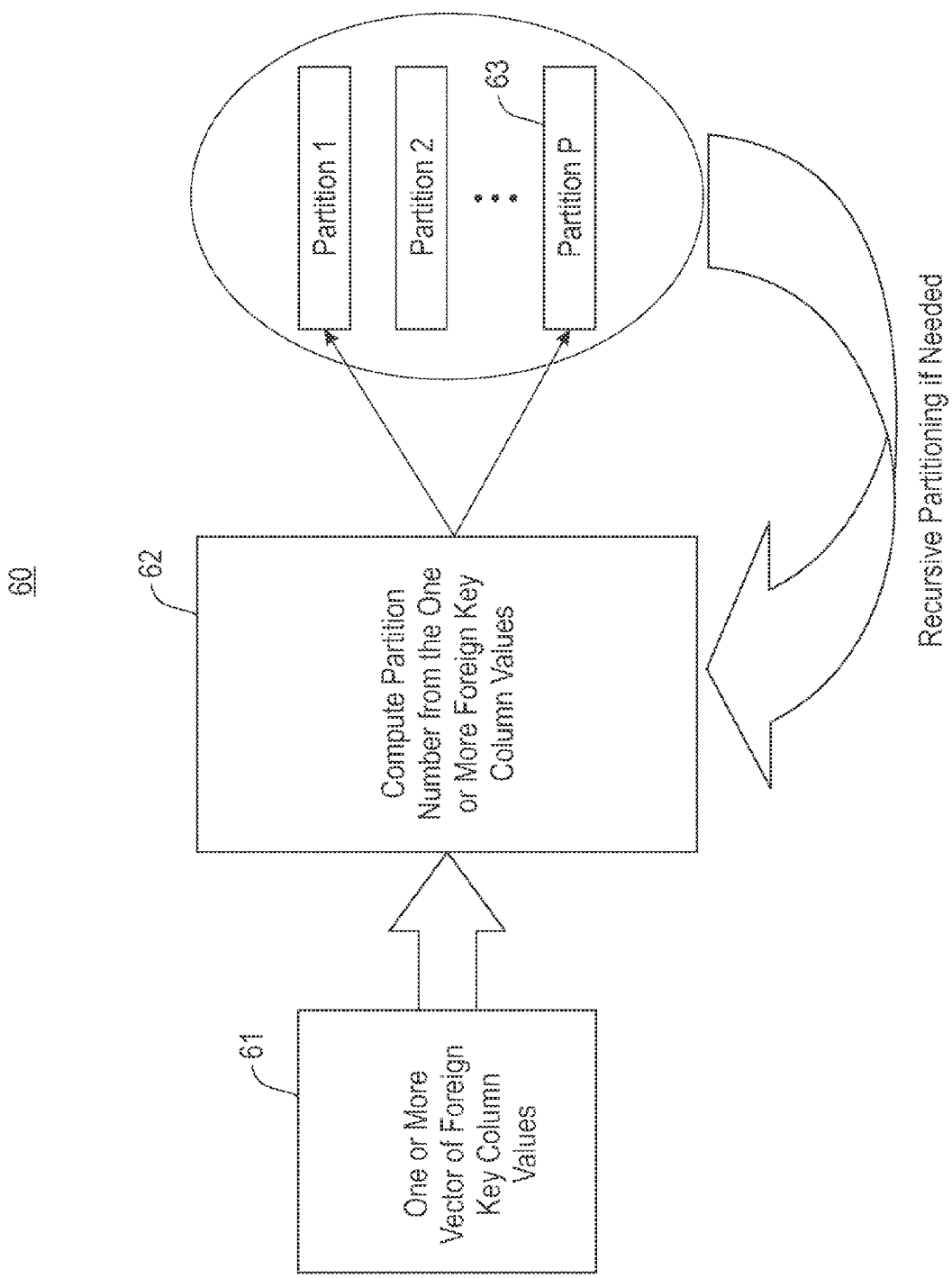
FIG. 4 illustrates an example of partitioning in database processing, according to an embodiment of the invention.

As illustrated by process 60 in FIG. 4, according to an embodiment of the invention, a partitioning stage comprises partitioning a vector of join-column values 61 into a number P of partitions 63 (i.e., Partition 1, Partition 2, . . . , Partition P). A computation block 62 computes partition number from the one or more join-column values.

The partitioning is performed in a stable fashion, wherein if two values fall into the same partition, their relative order stays the same after partitioning. As illustrated in FIG. 4, the partitioning may be performed in recursive steps where the output partitions from a previous step are themselves partitioned in subsequent steps. This is done so as to limit the number and size of partitions in each step to fit hardware cache and TLB constraints. An implementation of the partitioning stage is described in more detail further below.

Figure 5:
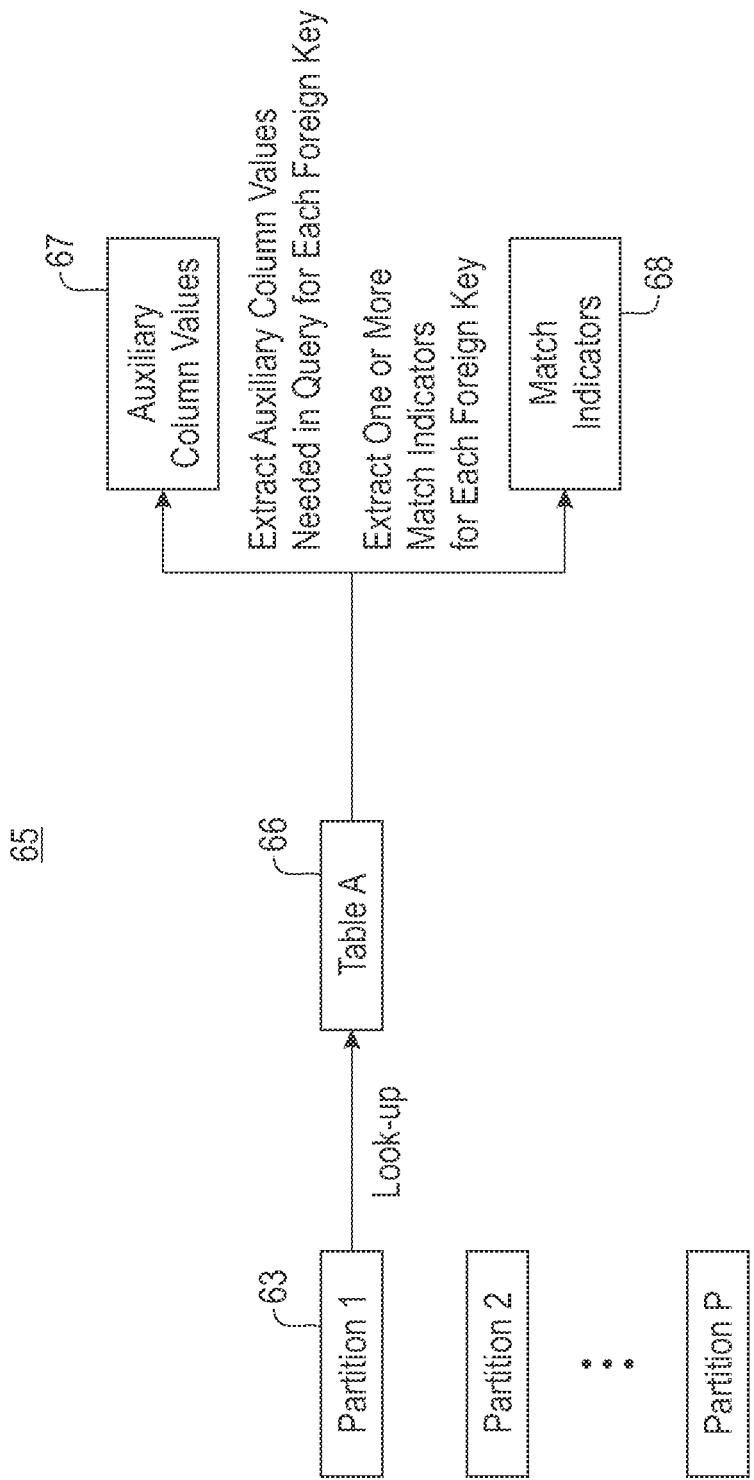
FIG. 5 illustrates an example of look-up in database processing, according to an embodiment of the invention.

As illustrated by example process 65 in FIG. 5, according to an embodiment of the invention a look-up stage comprises, for each partition of the join-columns produced by the partitioning stage, looking up the corresponding partition from the build table 66 for entries matching the value(s) of the join-columns of the probe table, and extracting, for each matching value found in the partition, values of any auxiliary columns 67 that are needed in the query. Generally, the build table partitions are maintained in hash table data structures.

In a preferred embodiment, for each join-column value, a Boolean value is computed as a match indicator 68 indicating whether that value found a match in the corresponding hash table (other variations include computing Booleans indicating whether no match was found, whether more than one match was found, etc). An implementation of the look-up stage is described in more detail further below.

Figure 6:
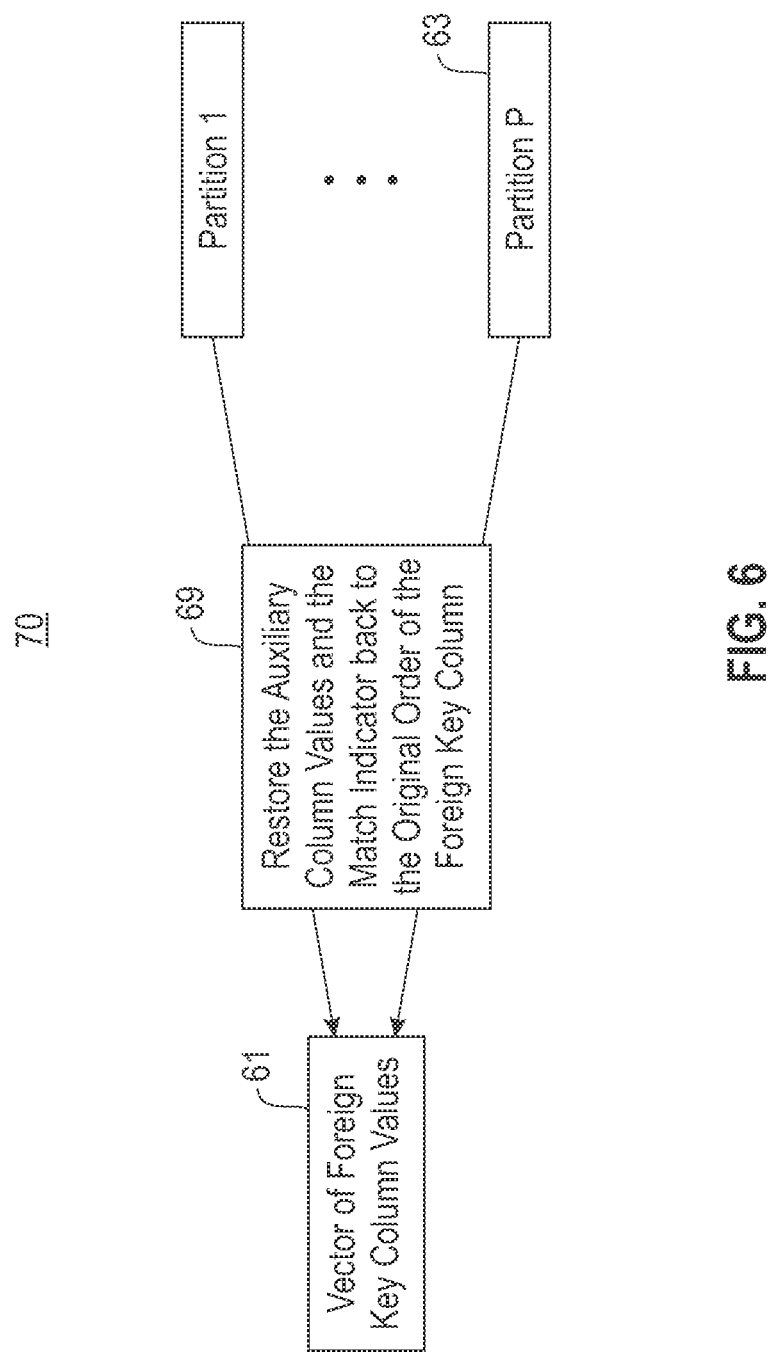
FIG. 6 shows an example of de-partitioning in database processing, according to an embodiment of the present invention.

As illustrated by example process 70 in FIG. 6, according to an embodiment of the invention a de-partitioning stage comprises a de-partitioning module 69 undoing the partitioning, and restoring the auxiliary column values and the Boolean match indicators back to the original order of the probe table. In most cases the join-columns themselves are not de-partitioned, because they are seldom needed later in the query. An implementation of the de-partitioning stage is described in more detail further below.

Figure 7:
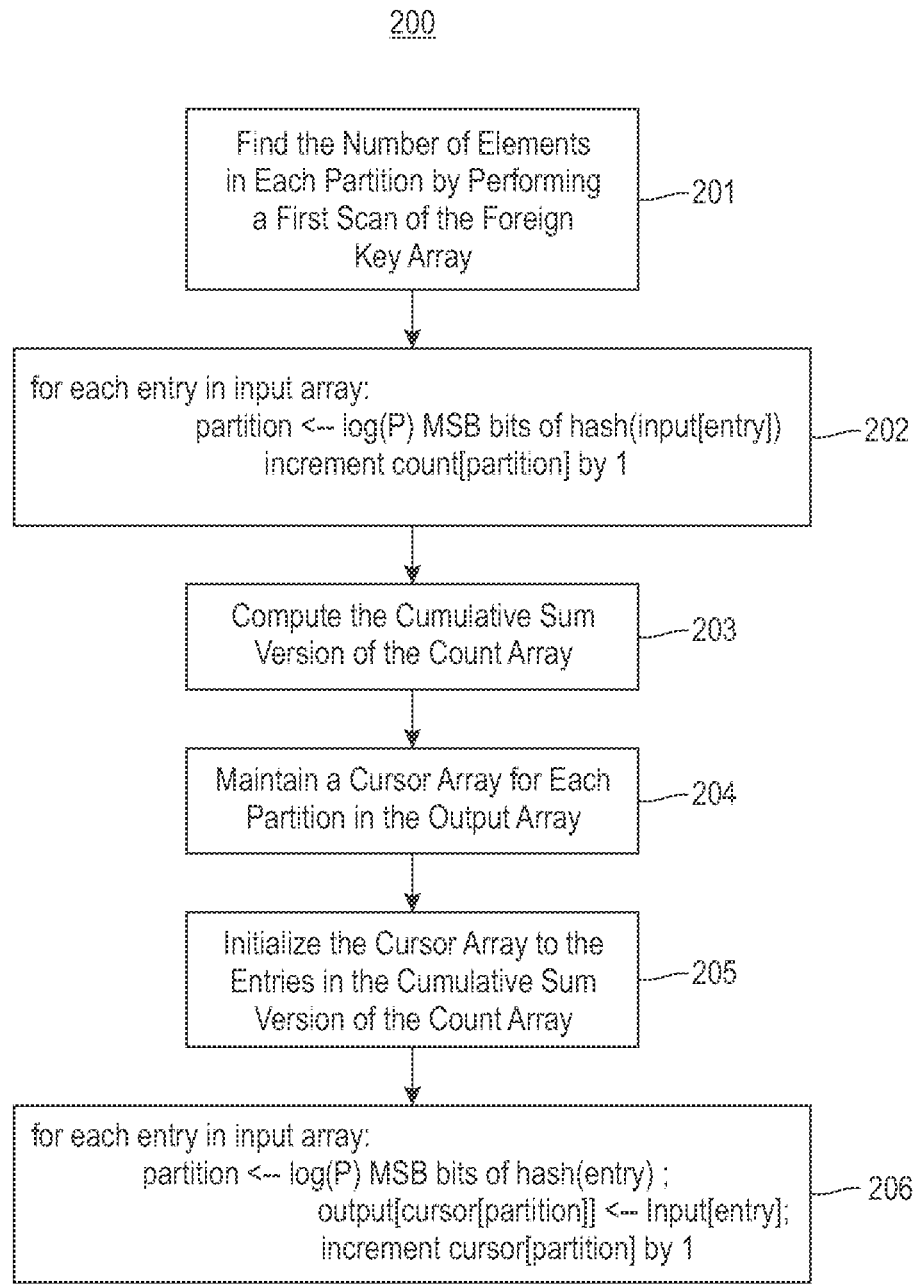
FIG. 7 shows a flowchart of partitioning in database processing, according to an embodiment of the present invention.

According to an embodiment of the invention, partitioning of the join-columns is performed by a hash function computation on the values of each join-column. The hash function is the same as that used for the hash table, wherein the most-significant log(P) bits are used to identify the partition. The remaining bits are used to lookup into the hash table. Partitioning involves a permutation operation on the array of join-column values (i.e., input array) to form an output array. FIG. 7 is a flowchart of a partitioning process 200, as described in Table 1 below, according to an embodiment of the invention.

TABLE 1

Partitioning

Process block 201: Find the number of elements in each partition by performing a first scan of the foreign key array;
Process block 202:
    for each entry in input array:
        partition <-- log(P) MSB bits of hash(input[entry])
            increment count[partition] by 1;
Process block 203: Compute the cumulative sum version of the count array produced per process blocks 201-202;
Process block 204: Maintain a cursor array for each partition in the output array;
Process block 205: Initialize the cursor array to the entries in the cumulative sum version of the count array produced per process block 203;
Process block 206:
    for each entry in input array:
        partition <-- log(P) MSB bits of hash(entry) ;
        output[cursor[partition]] <-- input[entry];
        increment cursor[partition] by 1.

According to an embodiment of the invention, the number of partitions is limited to the level-1 translation look-aside buffer (TLB) size, which is typically 64 on modern processors. When more partitions are needed, it is more efficient to perform a recursive partitioning than to perform a single-step partitioning into a large number of partitions.

Figure 8:
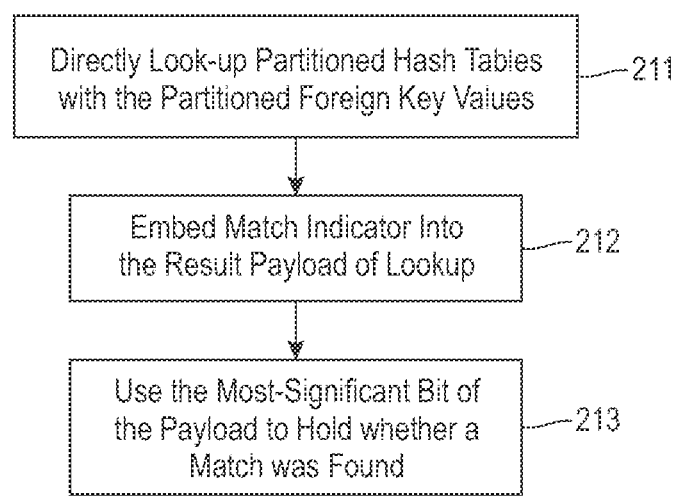
FIG. 8 shows a flowchart of table look-up in database processing, according to an embodiment of the present invention.

FIG. 8 is a flowchart of a process 210 for the look-up stage, according to an embodiment of the invention. Process block 211 comprises a direct look-up of partitioned hash tables with the partitioned join-column values. Process block 212 comprises optimizing by embedding the Boolean match indicator into the result payload of lookup. Process block 213 comprises using the most-significant bit of the payload to hold whether a match was found. The optimization reduces by a factor of 2 the number of cursors from which random lookups are performed during the de-partitioning stage, and improves performance significantly.

Figure 9:
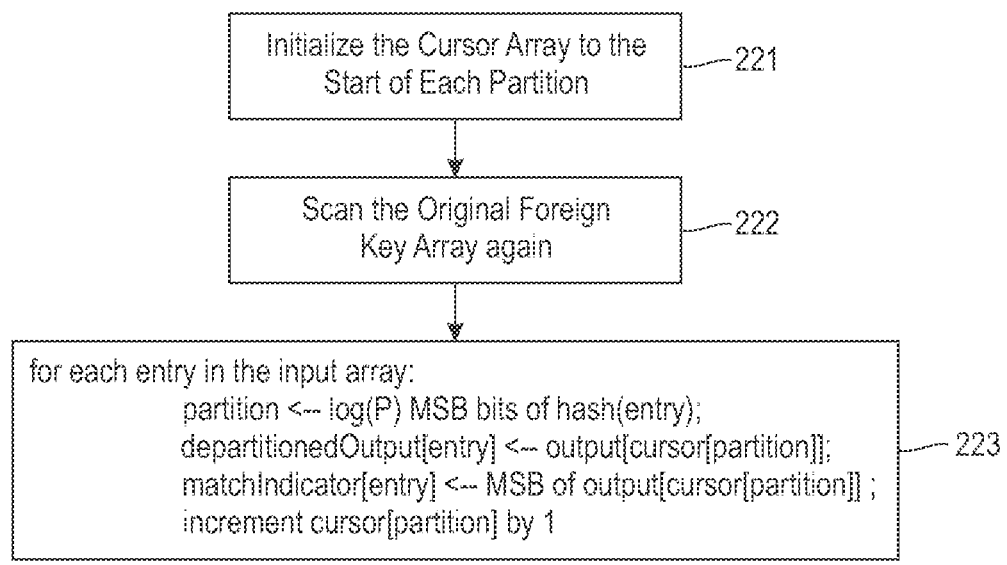
FIG. 9 shows a flowchart of de-partitioning in database processing, according to an embodiment of the present invention.

FIG. 9 is a flowchart of a process 220 for the de-partitioning stage (i.e., merging) as shown in Table 2 below, according to an embodiment of the invention.

TABLE 2

De-partitioning

Process block 221: Initialize the cursor array to the start of each partition;
Process block 222: Scan the original foreign key array again;
Process block 223: For each entry in the input array:
    partition <-- log(P) MSB bits of hash(entry);
        departitionedOutput[entry] <-- output[cursor[partition]];
        matchIndicator[entry] <-- MSB of output[cursor[partition]] ;
        increment cursor[partition] by 1.

The advantage of such de-partitioning is that it involves random reads, and not random writes. The writes are all performed sequentially, which is efficient. The random reads are also performed using only P cursors, which is efficient as long as P is less than the number of TLB entries.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer program product for partitioned join in a database, comprising a non-transitory computer usable medium including a computer readable program, wherein the computer readable program when executed on a computer causes the computer to perform:

partitioning a database table with column major layout by limiting partitioning to those columns containing join-columns including multiple keys for a join operator without partitioning other columns, wherein limiting partitioning is based on number of partitions determined by a first hardware constraint and size of the partitions that is determined by a second hardware constraint;
executing one or more join operations for joining the partitioned columns, wherein the other columns are not accessed during the one or more join operations;
joining a probe table with one or more build tables, comprising partitioning values of one or more join-columns in one or more steps, wherein in each step the number of the partitions and the size of the partitions is limited;
forming hash tables on the build tables;
mapping their respective join-column values of the hash tables to the values of any additional columns that are needed in a query;
scanning the probe table, wherein for each batch of join-column values, the values are looked up into the corresponding hash tables on the build tables;
looking up the corresponding partition from the build table;
extracting for each join-column value any auxiliary columns that are needed in the query;
computing one or more Boolean values for each join-column value including a Boolean value indicating whether a join-column value found any match in the hash table;
after lookup of a build table, de-partitioning the partitions;
limiting the number of partitions based on the first hardware constraint that comprises the number of entries in the level-1 translation lookaside buffer (TLB);
performing recursive partitioning when both the number of the partitions and the size of the partitions is constrained; and
de-partitioning the partitions to obtain the original ordering by sequentially writing and randomly reading table values using P cursors, wherein P is less than the number of entries in the TLB.

2. The computer program product of claim 1, further comprising:
undoing the partitioning in a de-partitioning step to convert the join result back into original order.

3. The computer program product of claim 1, wherein no other columns are accessed during the one or more join operations for joining the partitioned columns, and the multiple keys for the join operator comprise primary keys or foreign keys.

4. The computer program product of claim 1, wherein the join-columns comprise columns having one or more equality join predicates relating one or more columns of a probe table to one or more columns of a build table.

5. The computer program product of claim 1, wherein the size of each of the partitions is limited to the second hardware constraint that comprises a size of cache, and recursive partitioning comprises repeated partitioning of output partitions from a previous partitioning.

6. The computer program product of claim 1, wherein partitioning of the join-columns is performed by a hash function computation on the values of each join-column, and the hash function is a same hash function used for the hash table.

7. The computer program product of claim 1, wherein the partitioning comprises a permutation operation performed on an array of the join-column values for forming an output array.

* * * * *